(12) United States Patent
Nickeas et al.

(10) Patent No.: US 7,797,972 B2
(45) Date of Patent: Sep. 21, 2010

(54) SECURE FIRE HYDRANT CAP

(75) Inventors: Mark Nickeas, Lake Shorwood, CA (US); Martin Nickeas, Oxnard, CA (US)

(73) Assignee: Flow Security Systems, Inc., Camarillo, CA (US)

( * ) Notice: Subject to any disclaimer, the term of this patent is extended or adjusted under 35 U.S.C. 154(b) by 165 days.

(21) Appl. No.: 11/746,014

(22) Filed: May 8, 2007

(65) Prior Publication Data

US 2008/0127688 A1    Jun. 5, 2008

Related U.S. Application Data

(63) Continuation-in-part of application No. 11/164,876, filed on Dec. 8, 2005, now Pat. No. 7,287,404.

(60) Provisional application No. 60/634,340, filed on Dec. 8, 2004.

(51) Int. Cl.
*B65D 55/14* (2006.01)

(52) U.S. Cl. .............. 70/163; 70/176; 70/179; 70/232; 137/382; 220/210; 215/207

(58) Field of Classification Search ........... 70/163–169, 70/175–179, 229, 230, 232, 244, 416, 417, 70/370, 371, 373–375, 451, 367–369; 137/382, 137/296, 377; 411/910; 220/210; 215/207; 403/370, 371; 285/81, 84, 85, 91, 45, 46, 285/80, 148.19
See application file for complete search history.

(56) References Cited

U.S. PATENT DOCUMENTS 1,164,197 A * 12/1915 Kildear ................... 70/161

| | | | |
|---|---|---|---|
| 1,625,901 A | 4/1927 | Lay | |
| 1,702,205 A | 2/1929 | Freeman | |
| 1,702,532 A | 2/1929 | Boomer et al. | |
| 3,426,932 A | 2/1969 | Rouse | |
| 3,456,463 A * | 7/1969 | Mihalich | 70/168 |
| 3,605,460 A | 9/1971 | Singer et al. | |
| 3,748,879 A | 7/1973 | Singer et al. | |
| 3,817,065 A | 6/1974 | Sander | |
| 3,914,966 A * | 10/1975 | Bello | 70/163 |
| 3,915,335 A * | 10/1975 | Shanklin et al. | 220/303 |
| 4,100,629 A * | 7/1978 | Jones et al. | 4/295 |
| 4,122,695 A | 10/1978 | Hall | |
| 4,602,654 A * | 7/1986 | Stehling et al. | 137/296 |
| 4,984,698 A | 1/1991 | Stuckey | |
| 5,038,589 A * | 8/1991 | Martin | 70/368 |
| 5,072,750 A * | 12/1991 | Poms et al. | 137/296 |
| 5,549,133 A * | 8/1996 | Sigelakis | 137/296 |
| 5,820,290 A * | 10/1998 | Galindo | 403/327 |
| 5,904,057 A * | 5/1999 | Abney et al. | 70/167 |

(Continued)

*Primary Examiner*—Suzanne D Barrett
(74) *Attorney, Agent, or Firm*—Koppel, Patrick, Heybl & Dawson; Michael J. Ram

(57) ABSTRACT

A security device for engaging a threaded element includes an inner body configured to engage the threaded element and an outer body operatively coupled to the inner body. A pin is operatively coupled to the inner body and movable between an extended position and a retracted position such that the outer body moves relative to the inner body when the pin is disposed in the retracted position and the outer body and the inner body are operatively coupled for simultaneous movement when the pin is disposed in the extended position.

25 Claims, 6 Drawing Sheets

U.S. PATENT DOCUMENTS

| | | | | |
|---|---|---|---|---|
| 6,029,709 | A * | 2/2000 | Burgess | 138/89 |
| 6,112,761 | A * | 9/2000 | Scotto | 137/296 |
| 6,523,378 | B2 * | 2/2003 | Kuo | 70/360 |
| 6,733,045 | B2 * | 5/2004 | Harrington et al. | 285/148.19 |
| 7,140,212 | B2 * | 11/2006 | Trempala | 70/167 |
| 7,287,404 | B2 * | 10/2007 | Nickeas et al. | 70/163 |
| 7,409,843 | B1 * | 8/2008 | Rinehart, Sr. | 70/232 |
| 7,624,889 | B2 * | 12/2009 | Tharp et al. | 220/288 |
| 2003/0155765 | A1 * | 8/2003 | Thomas et al. | 285/305 |
| 2008/0209963 | A1 * | 9/2008 | Trempala | 70/167 |

* cited by examiner

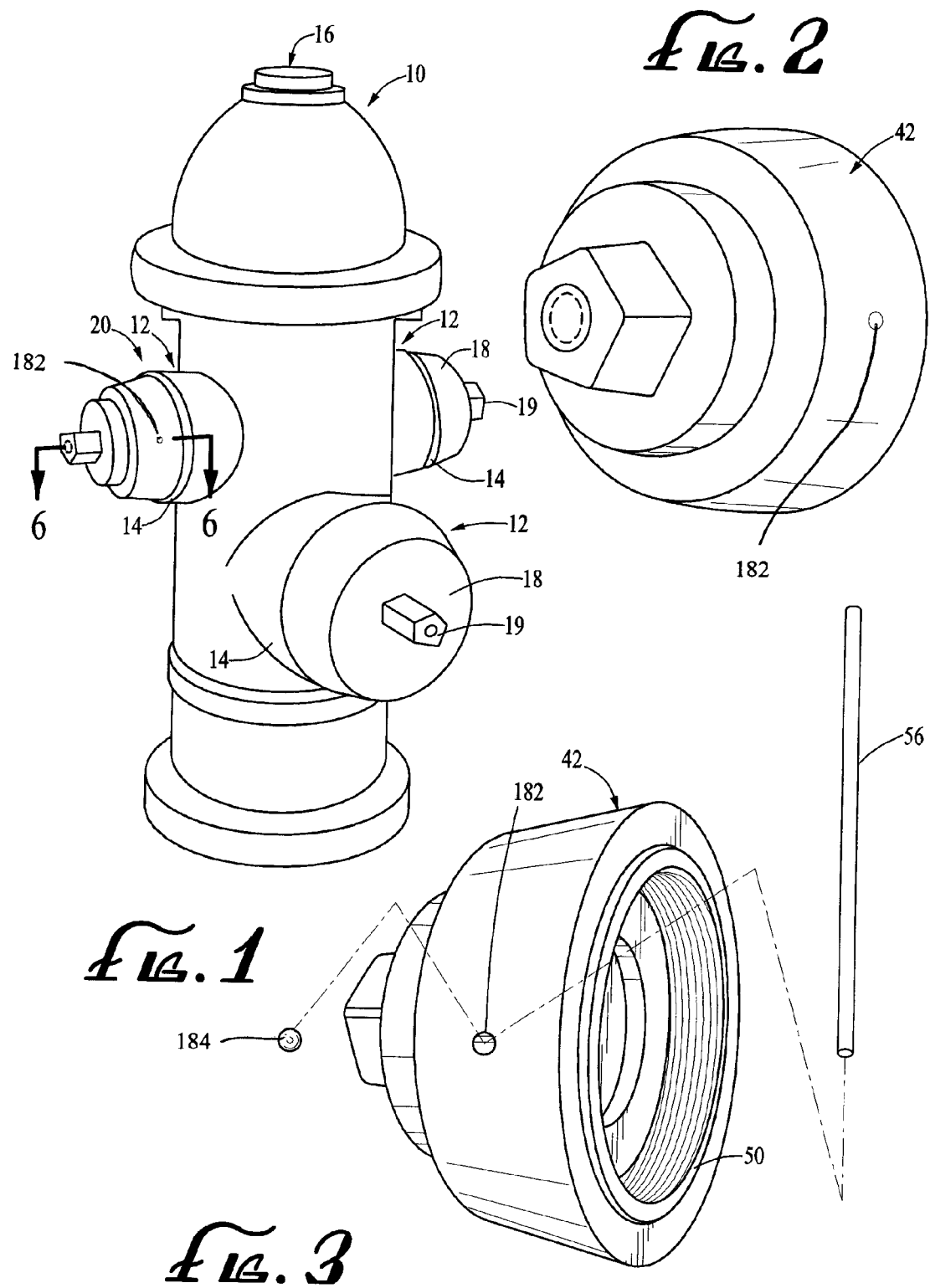

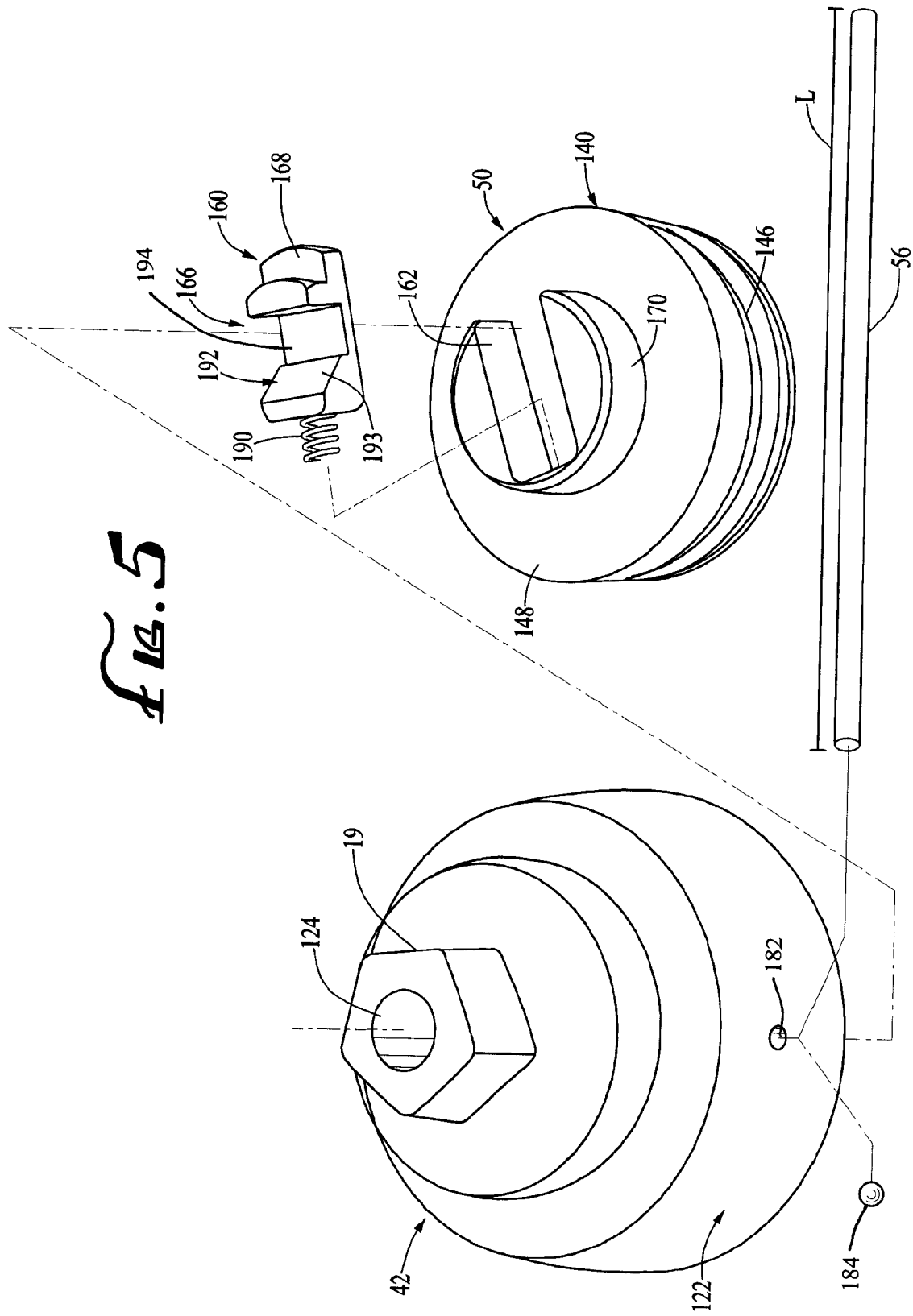

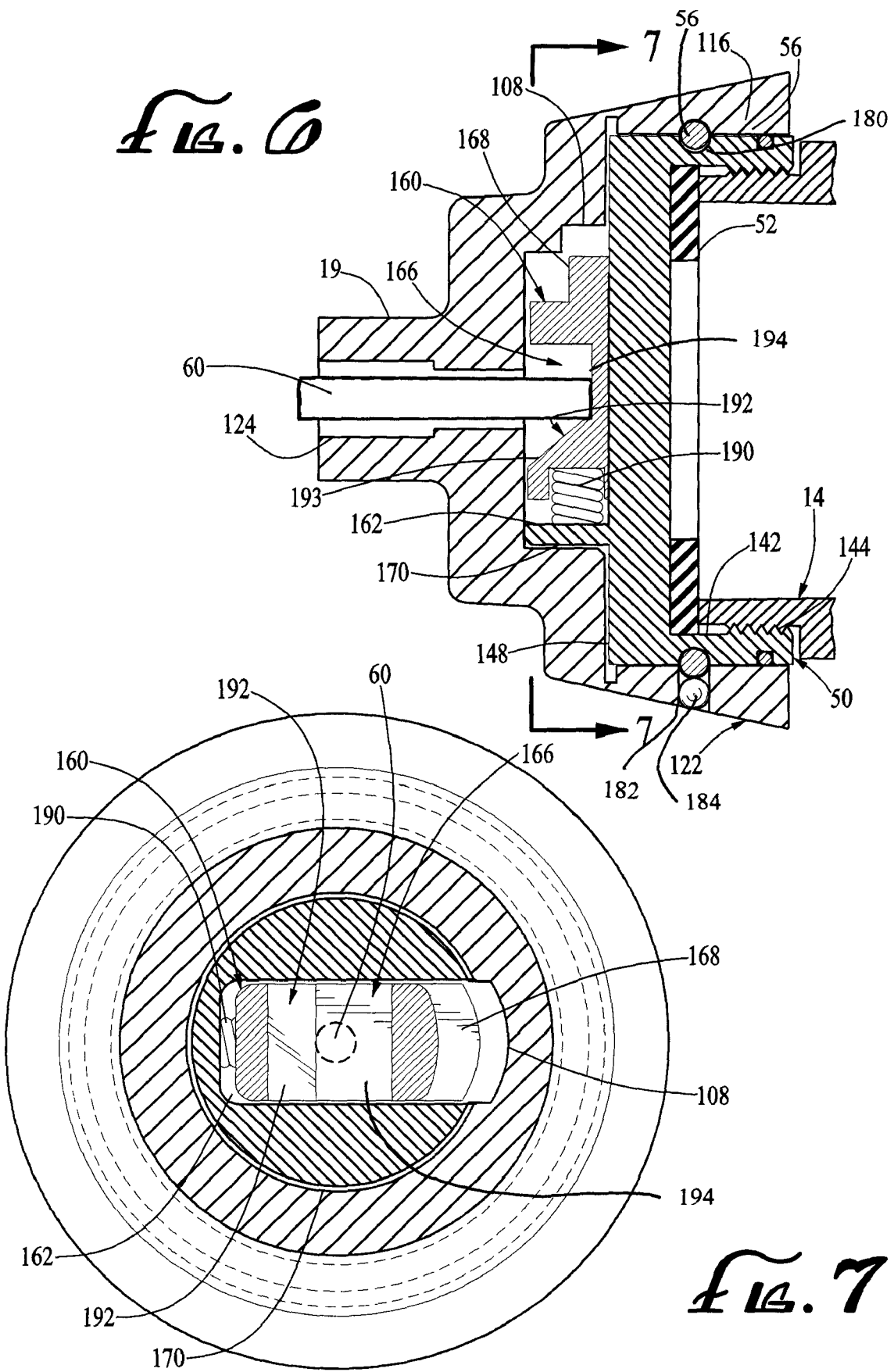

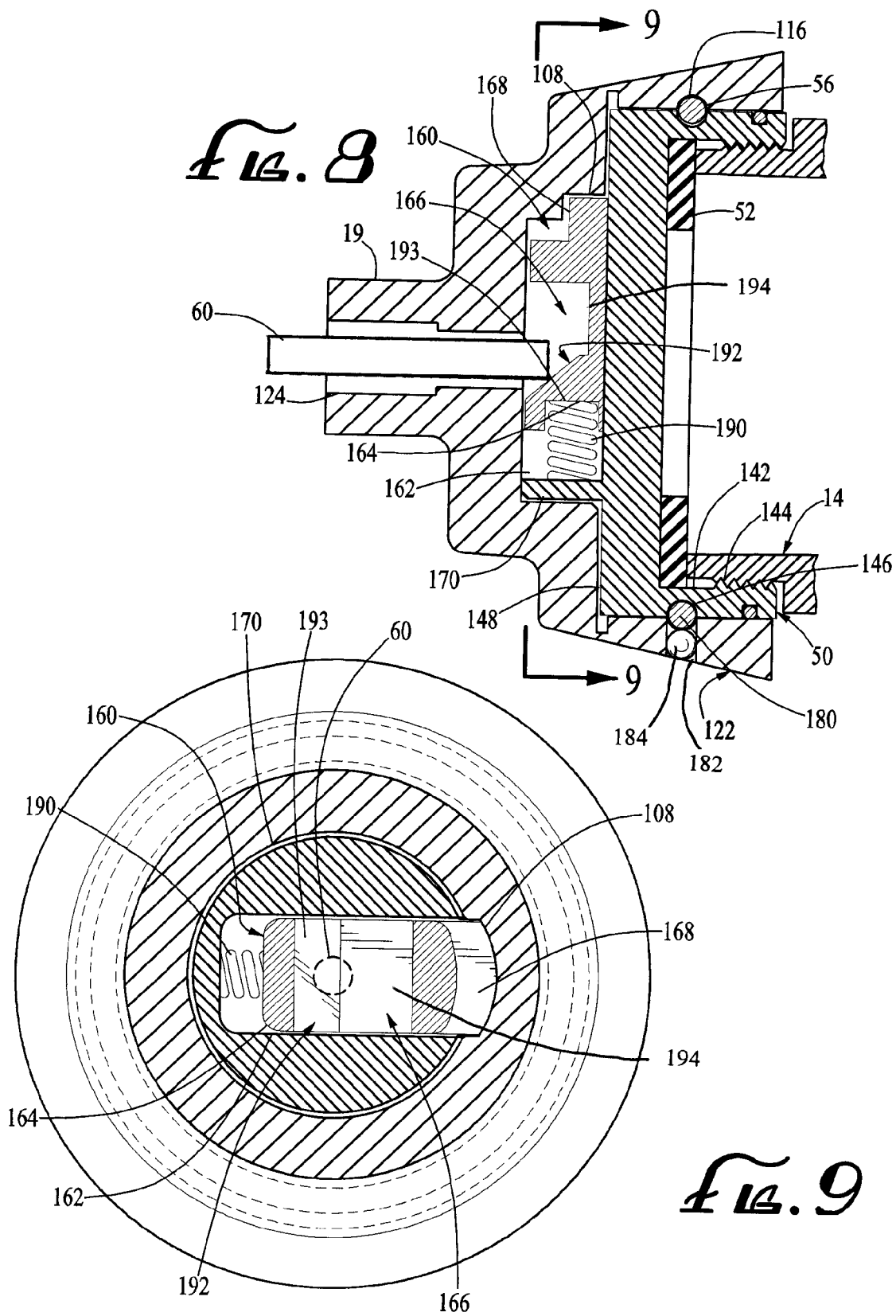

US 7,797,972 B2

SECURE FIRE HYDRANT CAP

RELATED APPLICATION

The present application is a continuation-in-part that claims the benefit of and priority from patent application Ser. No. 11/164,876, filed Dec. 8, 2005 now U.S. Pat. No. 7,287,404 which claims the benefit of and priority from provisional patent application Ser. No. 60/634,340, filed Dec. 8, 2004, both of which are incorporated by reference herein.

BACKGROUND

The present disclosure generally relates to locks, and more particularly, to a security device for engaging a threaded element to prevent unauthorized access thereto, regardless of whether the threaded element is a port of a fluid passageway, a control, or any other similar or like configured device or assembly.

Conventional locking devices for threaded elements have several disadvantages. One prominent disadvantage is that conventional locking devices attempt to be rigidly secured to the threaded element. However, this subjects the locking device to abuse and malfeasance because tools or other implements may be used to gain leverage or other advantage on the locking device. As a result, such conventional locking devices can often be easily defeated and removed by the application of overwhelming force.

Therefore, there exists a need in the art for a security device for threaded elements that overcomes the disadvantages of the conventional devices, is inexpensive to manufacture and is easy to assemble and operate.

BRIEF DESCRIPTION OF THE DRAWINGS

Certain embodiments are shown in the drawings. However, it is understood that the present disclosure is not limited to the arrangements and instrumentality shown in the attached drawings.

FIG. 1 is a perspective view of a security device constructed in accordance with the teachings of the present invention connected to a threaded element.

FIG. 2 is a front perspective view of the security device of FIG. 1.

FIG. 3 is a rear perspective view of the security device of FIG. 1 with a fastener shown in detail.

FIG. 5 is an exploded view of the security device of FIG. 1.

FIG. 6 is a cross sectional view of the security device of FIG. 1 taken at sectional line 6-6 of FIG. 1 and shown in the secured position.

FIG. 7 is a cross sectional view of the security device of FIG. 6 taken at sectional line 7-7 of FIG. 6.

FIG. 8 is a cross sectional view of the security device of FIG. 1 but shown in the unsecured position.

FIG. 9 is a cross sectional view of the security device of FIG. 8 taken at sectional line 9-9 of FIG. 8.

SUMMARY

Figure 4:
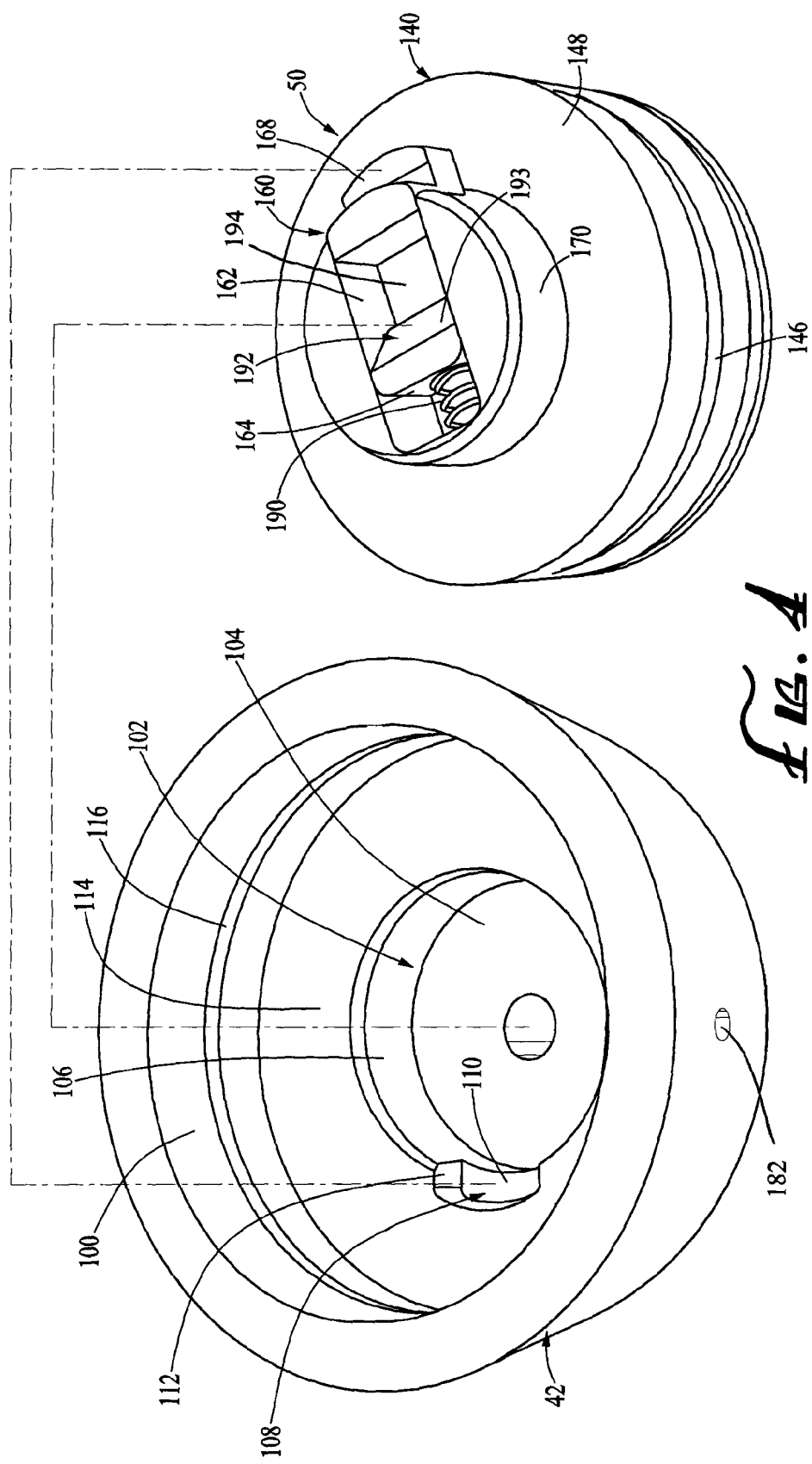
FIG. 4 is a partially exploded view of the security device of FIG. 1.
Figure 10:
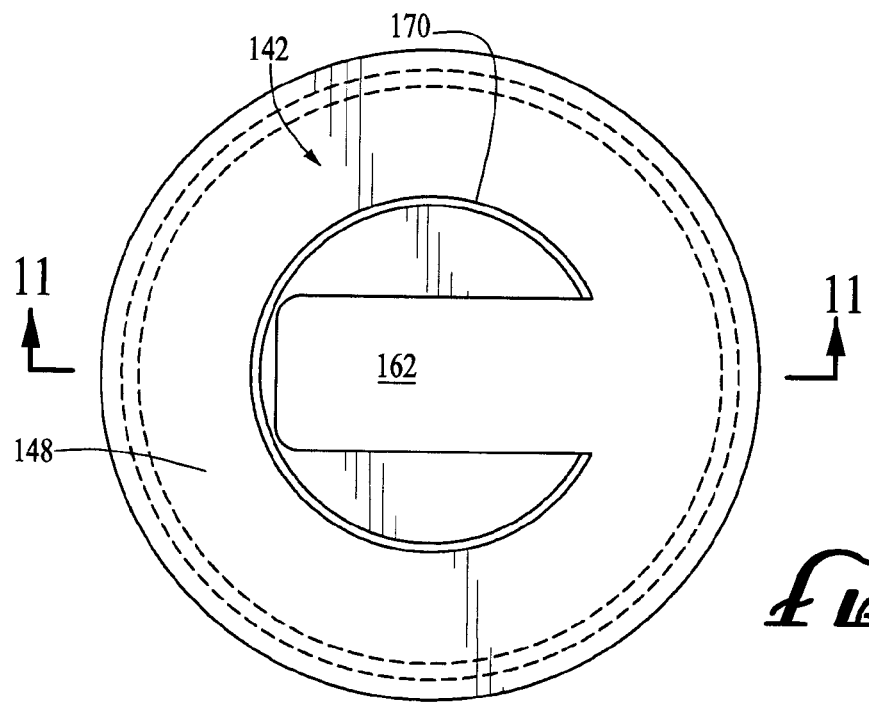
FIG. 10 is a top view of an outer body of the security device of FIG. 1.

In accordance with one principle aspect of the present disclosure, a security device for a threaded element includes an inner body configured to engage the threaded element and an outer body operatively coupled to the inner body. A pin is operatively coupled to the inner body and movable between an extended position and a retracted position such that the outer body moves relative to the inner body when the pin is disposed in the retracted position (i.e., the secured position) and the outer body and the inner body are operatively coupled for simultaneous movement (i.e., the unsecured position) when the pin is disposed in the extended position.

In accordance with another principle aspect of the present disclosure, a security device for a threaded element includes an inner body configured to engage the threaded element and an outer body operatively coupled to the inner body. A lock is adapted to operatively engage the outer body and a pin that is operatively coupled to the inner body and movable between an extended position and a retracted position such that the outer body moves relative to the inner body when the lock engages the pin, placing the pin in the retracted position, and the outer body and the inner body are operatively coupled for simultaneous movement when the lock does not engage the pin such that the pin is disposed in the extended position.

In accordance with another principle aspect or the present disclosure, a security device for a threaded element includes an inner body configured to engage the threaded element and an outer body operatively coupled to the inner body. A lock is adapted to operatively engage the outer body and a pin that is operatively coupled to the inner body. The pin is movable between an extended position and a retracted position by the lock. The outer body moves relative to the inner body when the lock engages the pin, placing the pin in the retracted position. The outer body and the inner body are operatively coupled for simultaneous movement when the lock does not engage the pin, allowing the pin to be disposed in the extended position.

DETAILED DESCRIPTION OF THE DISCLOSURE

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Referring to FIGS. 1-3, a security device 20 constructed in accordance with the teachings of one embodiment of the present disclosure is shown connected to a threaded element 14 (see FIGS. 6 and 8 for more detail). The threaded element 14, in one embodiment, may be configured as a port 12 for a fluid passageway commonly known as a fire hydrant 10 or may be configured as a control, such as, in one embodiment, the valve control 16 for the fire hydrant 10. Conventional fire hydrants 10 may have a plurality of ports 12, each of which may include a threaded element 14. Although the security device 20 is shown in FIG. 1 to be connected to the fire hydrant 10, as will become apparent from the following, the security device 20 may be connected to any threaded element, port or control, whether externally or internally threaded, to prevent unauthorized access. It is also within the teachings of the present disclosure that use of the expression "threaded element" as described herein is not in a limiting sense, but rather as a broad, open-ended descriptive expression. Rather, any port, control or other similar or like device, assembly, element or structure to which access is to be limited shall be considered to be encompassed within the "threaded element" expression.

A conventional fire hydrant 10 includes a plurality of ports 12 that may be the same size or have different sizes for attachment of different size hoses or other equipment thereto. Each port 12 is usually closed by a cap 18 to prevent access to the water through the fire hydrant 10. The port 12 typically has a threaded outer portion (not shown in FIG. 1, but shown in FIGS. 6 and 8 for an example of a threaded portion 14) on to which the cap 18 is connected by being screwed thereon. The cap 18 may include a drive mechanism 19 for opening and closing the cap 18. In FIG. 1 the drive mechanism is a five-sided nut. A correspondingly dimensional conventional tool (not shown) is used to engage the five-sided drive mechanism to remove the cap 18. Accordingly, to access water through the fire hydrant 10, one simply needs remove the cap 18 from the port 12 and open the fire hydrant valve 16 to access water through the fire hydrant 10.

The security device 20, which permits authorized access to the port 12, can be connected to the port 12 by being screwed thereon or by other suitable connection method. In the embodiment shown, the security device 20 includes an inner body 50 (see FIGS. 3-6 and 8) and an outer body 42. The security device 20 may further include a lock and a fastener 56 that may be used to operatively couple the outer body 42 to the inner body 50. Various different lock structures known in the art can be used to prevent unintended operation or removal of the security device 20.

As will be described in detail in the following, when the security device 20 is configured in a secured position, the security device 20 cannot be unscrewed, disconnected, uncoupled or removed from the port 12. Any attempt to remove, bypass or defeat the security device 20 by turning the security device 20 while in the secured position will result in the outer body 42 freely rotating relative to the inner body 50 of the security device 20. Accordingly, because the inner body 50 remains connected to the port 12, the security device 20 cannot be disconnected from the port 26.

When the security device 20 is configured in the unsecured position, the outer body 42 operatively engages the inner body 50. Accordingly, movement of the outer body 42, as may be by rotation, simultaneously moves likewise the inner body 50 about the port 12, thereby removing the security device 20 from the port 12.

Referring to FIGS. 4-12, the security device 20 is shown in more detail. The internal structure of the outer body 42 (shown upside down in FIG. 4) may be a generally annular structural configuration. An inner surface 100 of the outer body may have various different surface portions as a result of manufacturing. In one embodiment, an internal bore 102 may be defined as a portion of the inner surface 100 by the base wall 104 and the side wall 106. A recess 108 may also be defined as a portion of the inner surface 100, or in another embodiment by a shelf (not shown) formed adjacent the side wall 106 and a back wall 112. Preferably, in one embodiment, the internal bore 102 is defined so as to extend from the base wall 104 to an intermediate wall 114. A groove 116 in the inner surface 100 functions to facilitate operative coupling of the outer body 42 to the inner body 50.

An outer surface 122 of the outer body 42 preferably extends to cover the extent of the inner body 50 (see FIGS. 5, 6 and 8). A drive mechanism 19, similar to a conventional fire hydrant cap 18, is formed on and as a part of the outer surface 122. A lock is positioned in and adapted to operatively engage a central bore 124 extending axially through the center of the outer body 42. The central bore 124 preferably has an extent through the drive mechanism 19, such that the central bore 124 operatively communicates with the internal bore 102 defined in the inner surface 100 of the outer body 42. Preferably, the outer body 42 is made from a material sufficiently strong to withstand physical attempts to defeat the security device 20. Most preferably, the outer body 42 is formed from a metal, plastic, synthetic, composite or other suitable material which does not corrode or rust to an extent detrimental to functionality. It is within the teachings of this disclosure that other structural configurations of the elements or portions of the outer body 42, as described in the above paragraphs, may be available depending on the specific application, installation, etc. For example, the groove 116 may be configured as channel-shaped, a furrow, a crenel, canaliculated or any other suitable configuration. Additionally, the recess 108 may be defined in a different location, with a different shape or any other suitable configurations.

A fastener 56 (see FIGS. 3, 5 and 11) may be used to connect the outer body 42 to the inner body 50. Preferably, the fastener 56 facilitates free rotation of the outer body 42 relative to the inner body 50 when the security device is disposed in a secured position, yet the outer body 42 cannot be removed from the inner body 50 by tools, such as pliers or wrenches or any other like similar or related devices. In one embodiment of the present disclosure, the fastener 56 may be configured as a coil spring or straight wire that has an length L approximately equivalent to an extent of the passageway 182 defined by the opposing groove 116 on the outer body and inner body groove 146 respectively formed in the inner surface 100 of the outer body 42 and the outer surface 140 of the inner body 50. Accordingly, such a fastener 56 may be inserted into the passageway 180 extending through the wall of the outer body 42 when the outer body 42 and the inner body 50 are in position to be operatively coupled, as shown in FIG. 3. After the fastener 56 is fed into the passageway 180, 182, the outer body 42 and the inner body 50 are operatively coupled as shown in FIGS. 6 and 8. A ball bearing 184 is then inserted into passageway 182 to seal the opening. Those of skill in the art will recognize that other suitable fasteners may be used to achieve the same functionality and are within the teachings of the present disclosure.

Figure 11:
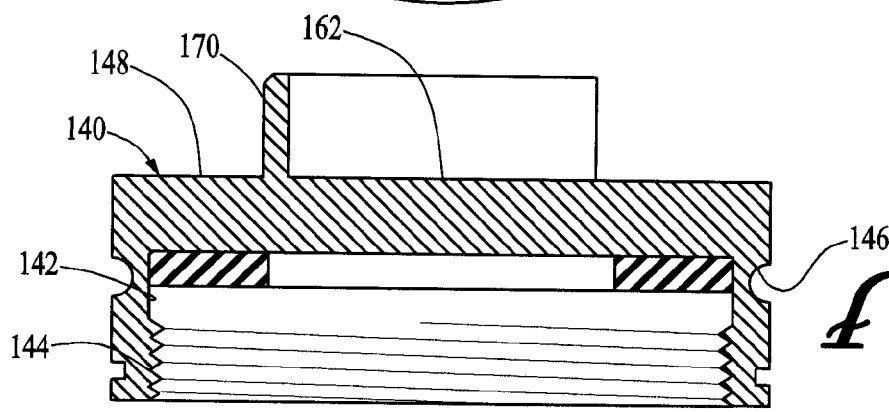
FIG. 11 is a cross sectional view of the outer body of FIG. 10 taken at sectional line 11-11 of FIG. 10.
Figure 12:
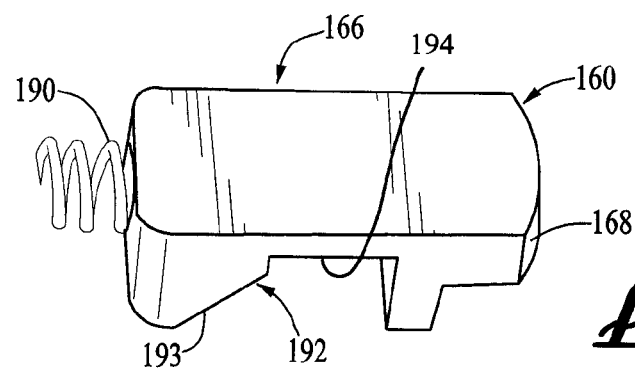
FIG. 12 is a perspective view of a pin.

In one embodiment, the inner body 50 may include an outer surface 140 (see FIGS. 4, 5, 6, 8, 10 and 11) and an inner surface 142 (see FIGS. 6, 8 and 11). Threads 144 (see FIGS. 6, 8 and 11) formed on the inner surface 142 engage a complimentary counter-threaded outer rim of the port 12, connecting inner body 50 to the port 12. It is within the teachings of the present disclosure that other methods may be used to connect the inner body 50 to the port 12. One of skill in the art will recognize that other similar or like connection or fastening configurations may be used with corresponding success as described herein.

A sealing element 52 (see FIGS. 6 and 8) may be disposed between the port 12 and the inner body 50 to form a water tight seal between the inner body 50 and the port 12, thereby preventing any leaks of fluid, i.e., liquid or gas, from exiting the security device 20 in the event unintended individuals open the fire hydrant valve in an attempt to overpower or defeat the security device 20. The sealing element 52 may be formed from any suitable material. For example, in one embodiment the sealing element may be a rubber disc. It is within the teachings of the present disclosure that the sealing element may be formed from plastics, synthetic materials, natural materials, metal, or any other suitable material. Alternatively, the seal can be left out and the inner body machined to provide a water tight seal.

In one embodiment as described above, the inner body 50 may include a groove 146 defined on the outer surface 140 such that the inner body groove 146 in cooperation with outer body groove 116 defined on the inner surface 100 of the outer body 42 define the passageway 180 that facilitates operative coupling and relative movement of the outer body 42 to the inner body 50.

In another embodiment, the inner body 50 may also include an extension 170 defined on the outer surface 140. The extension 170 projects above a shoulder 148 also defined on the outer surface 140. Preferably, a slot 162 is defined in the extension 170 sufficiently configured to facilitate guiding a pin 160 that operatively engages the inner body 50 such that the pin 160 is moveable between an extended position (see FIG. 8) and a retracted position (see FIG. 6). When the security device 20 is in the extended position, the extension 170 operatively engages the recess 108 defined in the outer body 42 (see FIGS. 6 and 8).

In one embodiment, the pin 160 is normally biased to the extended position. Such biasing may be facilitated by any suitable means. Preferably, in one embodiment a spring 190 may be disposed between a back wall 164 of the pin 160 and a surface of the rear portion of the slot 162. It is within the teachings of this disclosure that any other suitable biasing structure may be provided to facilitate the same general functionality. Although biased to the extended position, the pin 160 may not be moved to the extended position, as shown in FIGS. 8 and 9, by such biasing element until the outer body 42 is moved relative to the inner body 50 such that the pin 160 is aligned in registration with the recess 108 defined in the inner surface 100 of the outer body 42. Until such registered alignment, the outer body 42 will move relative to the inner body 50 and the pin 160 will engage a portion of the inner surface 100 of the outer body 42. Accordingly, the security device 20 may be considered to auto-engage in the unsecured position when properly configured.

The pin 160 may also include a main body portion 166, a projection portion 168 and an actuation portion 192. The main body portion 166 may be considered any portion of the pin 160 not specifically identified herein. The projection portion 160 may be an extension from the main body portion 166. The actuation portion 192 may be any surface that facilitates movement of the pin 160 to the retracted position when engaged by lock plug 60 of the lock, as will be described in more detail herein.

The lock structure usually includes a lock plug 60 that is movable between an extended position (See FIG. 6) and a retracted position (See FIG. 8), both by actuation of the lock mechanism. Preferably, the lock plug 60 is disposed in the extended position when connected to the outer body 42. One of ordinary skill in the art will recognize numerous methods by which such an extension and retraction of the lock plug 60 may be accomplished and all such teachings are within the scope of the present disclosure. The lock plug 60 is disposed in an extended configuration when the security device is in its secured configuration. When the plug 60 is disposed in a retracted configuration the security device is in its unsecured configuration.

When disposed in the unsecured position (FIGS. 8 and 9), the security device 20 may be connected to or disconnected from the threaded element 14. This is because the projection portion 168 engages the recess 108, thereby resulting in simultaneous movement of the outer body 42 and the inner body 50. In order to dispose the security device 20 in the secured position, the lock is operated such that the lock plug 60 is moved from the retracted position shown in FIGS. 8 and 9 to the extended position shown in FIGS. 6 and 7. Such movement of the plug 60 causes the plug 60 to engage the actuation portion 192 of the pin 160 and more specifically the actuation surface 193 of the pin 160. In this embodiment, the actuation surface 193 is disposed at an angle to the plug 60 so that engagement between the actuation surface 193 and the plug 60 results in movement of the pin 160 from the extended position to the retracted position. The final result in shown in FIGS. 6 and 7, wherein the plug 60 in the extended position fully engages the pin 160 after engaging the actuation surface 193 such that the plug 60 is disposed in a well 194 in the main body portion 166. It is within the teachings of this disclosure that the actuation surface may have any suitable configuration to facilitate the aforementioned function. For example, the actuation surface may be curved or have steps or any other suitable configuration. The security device 20, now disposed in the secured position may be unmonitored without fear of break-in.

In the secure position (as shown in FIGS. 6 and 7), the lock plug 60 is disposed in the extended position in engagement with the pin 160. Accordingly, the outer body 42 is free to rotate relative to the inner body 50. Therefore, any rotation of the outer body 42 will not cause a rotation of the inner body 50. To prevent access to the threaded element 14 when the security device 20 is in the secure position, the free-spinning outer body 42 is freely rotatably mounted to the inner body 50, as described above.

In the unsecured position (as shown in FIGS. 8 and 9), the lock plug 60 is retracted from the well 194 in the main body portion 166. Accordingly, in the unsecured position, the spring 190 moves the pin 160 forward, causing the retracted plug 60 to engage the recess 108 of the outer body 42 so that any rotation of the outer body 42 also causes a rotation of the inner body 50, as described above.

The security device 20 can be constructed from a number of materials depending on the application for which the security device 20 is used. For example, a security device 20 that is constructed for use with the fire hydrant 10, as described in the foregoing, may be constructed from the same materials as the fire hydrant 10. Such materials include any type of metallic materials such as brass, copper, steel, or the like and alloys thereof to prevent corrosion and increase longevity because the fire hydrant 10 is typically exposed to an outdoor environment. The security device 20 may also be constructed from other materials that provide corrosion and weather resistance, for example, synthetic, natural or plastic materials. Furthermore, the security device 20 may be constructed with materials that are not easily breakable or not susceptible to an unauthorized user who may attempt to use excessive force to break the security device 20. For applications where the security device 20 is used indoors, the security device 20 may be constructed from hard plastics so as to be lightweight and easy to mass manufacture. The components of the security device 20 may be constructed from a variety of different materials and not simply one or two materials.

While the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A security device for a threaded element, the security device comprising:
    an inner body configured to engage the threaded element;
    a pin operatively engaging the inner body and movable between an extended position and a retracted position; wherein the pin is normally biased to the extended position,
    a lock plug disposed in the securing device displacing the pin from its normal biased extended position to maintain the security device in a secured configuration, and
    an outer body operatively coupled to the inner body,
        wherein the outer body moves relative to the inner body when the pin is disposed in the retracted position and the outer body and the inner body are operatively coupled for simultaneous movement when the pin is disposed in the extended position.

2. The security device as recited in claim 1, wherein the inner body includes a threaded portion complimentary to the threaded element.

3. The security device as recited in claim 1, wherein the inner body includes an extension that operatively engages a bore defined as a portion of an inner surface of the outer body.

4. The security device as recited in claim 3, wherein the inner body includes a slot defined in the extension that is configured to guide the pin as the pin is moved between the extended and retracted positions.

5. The security device as recited in claim 1, wherein the pin engages an inner surface of the outer body until aligned in registration with a recess formed in the inner surface of the outer body such that the pin may be disposed in the extended position.

6. The security device as recited in claim 1, wherein the pin includes a main body portion, a projection portion and an actuation portion.

7. The security device as recited in claim 6, wherein the actuation portion is defined by an actuation surface, such that when fully engaged by the lock plug the pin is disposed in the retracted position.

8. The security device as recited in claim 6, wherein the projection portion engages, when aligned in registration, a recess defined on an inner surface of the outer body when the pin is disposed in the extended position.

9. The security device as recited in claim 1, further comprising a fastener disposed between the inner and outer bodies to facilitate the operative coupling of the inner and outer bodies.

10. The security device as recited in claim 1, wherein the outer body includes a recess defined on an inner surface.

11. A security device for a threaded element wherein the threaded element is a control device or a port for a fluid passageway, the security device comprising:
    an inner body configured to engage the threaded element;
    a pin operatively engaging the inner body and movable between an extended position and a retracted position wherein the pin is normally biased to the extended position,
    a lock plug disposed in the securing device displacing the pin from its normal biased extended position to maintain the security device in a secured configuration, and
    an outer body operatively coupled to the inner body,
        wherein the outer body moves relative to the inner body when the pin is disposed in the retracted position and the outer body and the inner body are operatively coupled for simultaneous movement when the pin is disposed in the extended position.

12. A security device for a threaded element, the security device comprising:
    an inner body configured to engage the threaded element;
    a pin operatively engaging the inner body and movable between an extended position and a retracted position wherein the pin is normally biased to the extended position,
    an outer body operatively coupled to the inner body; and
    a locking structure adapted to operatively engage the outer body and the pin, the locking structure displacing the pin from its normal biased extended position to maintain the security device in a secured configuration
        wherein the outer body moves relative to the inner body when the locking structure engages the pin so that the pin is disposed in the retracted position and the outer body and the inner body are operatively coupled for simultaneous movement when the locking structure does not engage the pin such that the pin is disposed in the extended position.

13. The security device as recited in claim 12, wherein the locking structure is disposed in a bore formed in the outer body.

14. The security device as recited in claim 12, wherein the locking structure is removable from the outer body.

15. The security device as recited in claim 12, wherein the inner body includes a threaded portion complimentary to the threaded element.

16. The security device as recited in claim 12, wherein the inner body includes an extension that operatively engages a bore defined as a portion of an inner surface of the outer body.

17. The security device as recited in claim 16, wherein the inner body includes a slot defined in the extension that is configured to guide the pin as the pin is moved between the extended and retracted positions.

18. The security device as recited in claim 12, wherein the pin engages an inner surface of the outer body until aligned in registration with a recess formed in the inner surface of the outer body such that the pin may be disposed in the extended position.

19. The security device as recited in claim 12, wherein the pin includes a main body portion, a projection portion and an actuation portion.

20. The security device as recited in claim 19, wherein the actuation portion is defined by an actuation surface, that when fully engaged by the locking structure disposes the pin in the retracted position.

21. The security device as recited in claim 19, wherein the projection portion engages, when aligned in registration, a recess defined on an inner surface of the outer body when the pin is disposed in the extended position.

22. The security device as recited in claim 12, further comprising a fastener disposed between the inner and outer bodies to facilitate the operative coupling of the inner and outer bodies.

23. The security device as recited in claim 12, wherein the outer body includes a recess defined on an inner surface.

24. The security device of claim 7 wherein the lock plug is disposed in an extended position placing the security device in a secure position.

25. The security device of claim 20 wherein the locking structure is in an extended position placing the security device in a secure position.

* * * * *